July 28, 1931. C. C. FARMER 1,816,078
FLUID PRESSURE BRAKE
Filed March 12, 1929
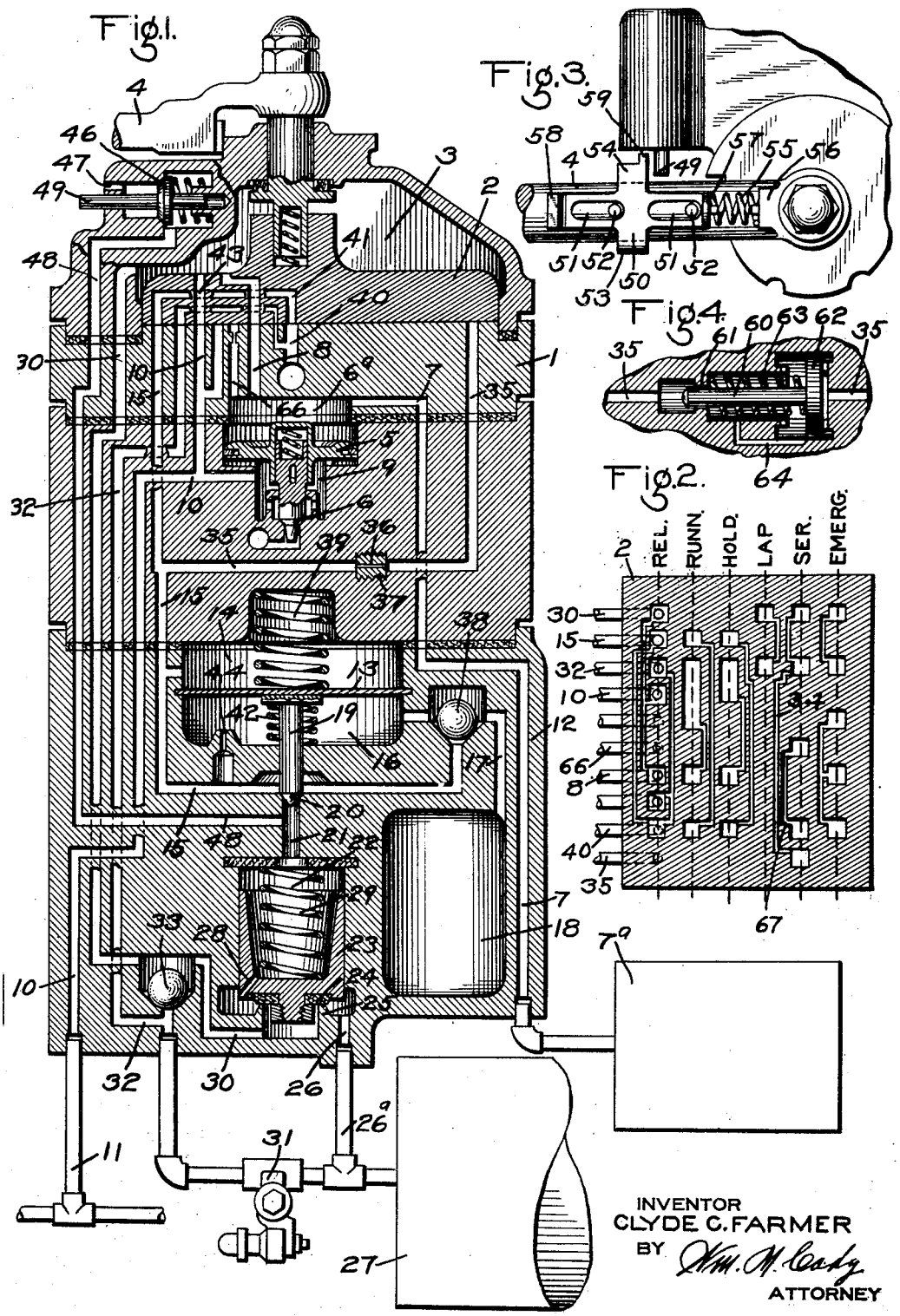
INVENTOR
CLYDE C. FARMER
BY Wm. M. Cady
ATTORNEY Patented July 28, 1931

1,816,078

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed March 12, 1929. Serial No. 346,297.

This invention relates to fluid pressure brakes, and more particularly to apparatus for charging the brake pipe of a fluid pressure brake system.

With the standard fluid pressure brake system, an engineer's brake valve device is provided which has a full release position, and in this position, fluid under full main reservoir pressure is supplied to the brake pipe. In another position, known as the running position, fluid is supplied to the brake pipe at the standard degree of pressure carried in the brake system, as determined by the setting of a feed valve device.

By supplying fluid at main reservoir pressure to the brake pipe in full release position, the release of the brakes at the rear portion of the train is hastened, and the liability of individual triple valve devices to fail to move to release position is reduced, while the time required to recharge the brake pipe is shortened.

The brake valve device should be left in full release position for an interval of time which should vary, primarily, with the amount of the preceding brake pipe reduction. If, however, the brake valve be held too long in full release position, the brakes at the forward end of the train will be overcharged, which is undesirable.

The principal object of my invention is to provide means associated with a brake valve device for automatically cutting off the flow of fluid at main reservoir pressure to the brake pipe in full release position after an interval of time which varies according to the extent of the preceding brake pipe reduction, and thereafter supplying fluid to the brake pipe through the feed valve device.

In the accompanying drawings; Figure 1 is a sectional view of a brake valve device and associated means embodying my invention; Fig. 2 a diagram showing the port connections made in the different positions of the brake valve device; Fig. 3 a plan view of the brake valve device; and Fig. 4 a sectional view of a modification employed in connection with my invention.

The brake valve device shown in Fig. 1 may be of the usual standard construction, but modified as required for use in connection with my invention, some of the usual ports and passages having been omitted, as not necessary to a clear understanding of the invention. The brake valve device comprises a casing section 1 having a valve seat for a rotary valve 2, contained in valve chamber 3, and adapted to be operated by handle 4.

Contained in the casing is the usual equalizing discharge valve mechanism comprising an equalizing piston 5 and a brake pipe discharge valve 6 adapted to be operated by piston 5. The chamber 6ª at one side of the piston 5 is connected through passage 7 to the usual equalizing reservoir 7ª and has a passage 8, leading to the seat of rotary valve 2. The chamber 9 at the opposite side of piston 5 is connected to a passage 10, which communicates with the usual brake pipe 11 and also leads to the seat of valve 2.

The means for accomplishing the purposes of my invention, for convenience, are shown as incorporated in a casing section 12 applied to the brake valve casing 1, but may just as well be embodied in a separate valve casing connected to the brake valve device by piping. As shown, the casing 12 contains a flexible diaphragm 13 having the chamber 14 at one side connected to a passage 15, which leads to the seat of rotary valve 2.

The chamber 16 at the opposite side of the diaphragm is connected to a passage 17, which leads to a timing reservoir or chamber 18. Engaging the underside of diaphragm 13 is the stem 19 of a valve 20, which controls communication from passage 15 to a passage 21, leading to chamber 22 at the spring side of a valve piston 23, said valve piston having a seat gasket 24 at its lower face adapted to engage an annular seat rib 25.

The area of the valve piston 23 outside the seat rib 25 is open to a passage 26, leading to the usual main reservoir 27, and a restricted port 28 in the valve piston connects passage 26 with the spring chamber 22. A coil spring 29 urges the valve piston to its seat. When the valve piston lifts from its seat, communication is established from passage 26 to the usual main reservoir passage 30, which opens into the rotary valve chamber 3.

A feed valve device 31 of the usual construction, adapted to supply fluid at a reduced pressure to the brake pipe, is connected to the pipe 26ª and is adapted to supply fluid to passage 32, which leads to the seat of the rotary valve 2. Passage 32 communicates with passage 30 past a ball check valve 33. With the valve 20 seated, fluid under pressure equalizes through the restricted port 28 into chamber 22, so that the spring 29 operates to maintain the valve piston 23 in its seated position.

In operation, when the brake valve handle 4 is turned to service application and only in this position, fluid under pressure is supplied from the feed valve device, through passage 32, cavity 34 in rotary valve 2 to passage 35, through which fluid flows to passage 15, by way of a restricted port 36 in a choke plug 37. From passage 15, fluid flows to chamber 14 at one side of diaphragm 13, and also past the check valve 38 to passage 17 and the timing reservoir 18, also charging the diaphragm chamber 16. The timing reservoir 18 is thus charged at a predetermined rate, so long as the brake valve remains in service application position. Chambers 14 and 16 being charged at equal pressures, the spring 39 acts on diaphragm 13 to hold the valve 20 closed.

In service position, fluid under pressure is vented from chamber 6ª of the equalizing discharge valve mechanism and from the equalizing reservoir 7ª, so that the discharge valve 6 is operated by piston 5 in the usual manner to vent fluid under pressure from the brake pipe 11.

Upon movement of the brake valve handle to release position, to effect the release of the brakes, passage 15 is connected to exhaust port 40, through cavity 41 in the rotary valve 2, so that the pressure in chamber 14 is reduced to atmospheric pressure. The fluid pressure in chamber 16 and in the timing reservoir 18 then operates to lift the diaphragm 13, permitting the spring 42 to unseat the valve 20. Fluid under pressure is then vented from chamber 22 to passage 15 and the atmosphere and the main reservoir pressure acting on the area of valve piston 23 outside the seat rib 25 then operates to lift the valve piston from its seat, permitting fluid under pressure to flow from the main reservoir 27 to passage 30 and thence to the rotary valve chamber 3. From the rotary valve chamber, fluid at main reservoir pressure flows through ports 43 to passage 10 and thence to the brake pipe 11.

The valve 20 remains open until the pressure in the timing reservoir 18 and in chamber 16 has been reduced by flow of fluid through a restricted timing port 44 to such a degree, as to permit the pressure of spring 39 to move the diaphragm 13 and effect the closure of the valve 20.

With the valve 20 seated, the chamber 22 is again charged with fluid under pressure as supplied through the restricted port 28, thus permitting the spring 29 to shift the valve piston 23 to its lower seat. Further flow of fluid from the main reservoir to the brake pipe is thus prevented.

Immediately following the movement of the valve piston 23 to its seat, the passage 30 being connected to the brake pipe 11 through the rotary valve 2 in release position, the pressure in said passage reduces to and with brake pipe pressure and when the pressure in passage 30 reduces below the setting of the feed valve device 31, the feed valve device immediately becomes active, and supplies fluid under pressure to passage 30, past the check valve 33, so as to maintain the brake pipe pressure at the normal pressure throughout the period required to fully recharge the brake system.

When a light service reduction in brake pipe pressure is made, say for example, a five pound reduction, the value of spring 39 may be such as to prevent the opening of valve 20 by the relatively light pressure admitted to the timing reservoir 18 and thus a high pressure release inshot of fluid is avoided, where such an inshot is liable to produce an overcharge of the brakes at the head end of the train.

When a somewhat heavier brake pipe reduction is made and, therefore, a greater pressure is built up in the timing reservoir 18, a high pressure release inshot will be obtained, but will not be sustained through the maximum period, because owing to the relatively low pressure charge in the timing reservoir, the pressure will soon be reduced below the value of the spring 39.

When, however, a full service reduction in brake pipe pressure is effected, the timing reservoir and the chamber 16 will be charged up to the setting of the feed valve 31, and the release inshot of fluid will then continue throughout the maximum predetermined time period.

In the running and the holding positions of the brake valve, the passage 15 is also connected to the atmosphere, so as to prevent possible leakage of fluid at the rotary valve from accumulating in the timing reservoir 18 and in chamber 16, while the brake valve is in these positions.

It follows, that when a service application of the brakes is made and this is followed by a partial release in running position, the inshot valve piston 23 will open, but this cannot influence brake pipe pressure, because, in running and maintaining positions, passage 30 is not connected to the brake pipe through the rotary valve 2 and check valve 33 prevents flow from passage 30 to passage 32, the passage 32 being open to the brake pipe only in the running and maintaining positions of the brake valve.

It may sometimes be desirable to provide a direct flow of fluid under pressure from the main reservoir to the brake pipe for a longer period than is provided by operation of the hereinbefore described automatic inshot valve means, such as where the fluid pressure brake system of a train is to be charged from zero gage pressure and it is desired to shorten the charging time.

To accomplish this purpose, a valve 46 is provided which is adapted, when opened, to vent fluid under pressure from chamber 22 of the valve piston 23 through passage 48 to an atmospheric exhaust port 47. The valve 46 is provided with an operating stem 49. Mounted on the brake valve handle 4 is a member 50 having slots 51 into which extend pins 52 secured to the handle.

At one side, the member 50 may be provided with a guide portion 53 which extends around the edge of the handle 4. At the opposite side, the member 50 is provided with a lug 54. Inward movement of the member 50 is resisted by a spring 55 which engages a stop 56 carried by the handle, at one end, and an upturned lug 57 of the member at the other end.

When it is desired to supply fluid from the main reservoir to the brake pipe for a longer period than permitted by operation of the automatic inshot valve means, before he moves the brake valve handle to release position, the engineer shifts the member 50 by pushing on the finger piece 58. The lug 54 is thus brought into alinement with the stem 49, so that when the handle 4 is moved to release position, the lug 54 will engage the stem 49 and thus operate said stem to unseat the valve 46. Fluid under pressure is then vented from the chamber 22 of the valve piston 23, so that said valve piston is moved from its seat, permitting the flow of fluid directly from the main reservoir to the brake pipe, so long as the handle 4 is held in release position.

The projection 59 engages the side of the stem 49 while the handle is in release position, so that the member 50 is prevented from moving out of its stem engaging position, when said member is released by the engineer.

However, when the handle 4 is moved from release position, the spring 55 acts to shift said member back to its normal position, in which the valve stem 49 is not engaged by the lug 54 when the handle is moved to release position.

If it be found necessary or desirable to employ a timing reservoir of so small a volume that the restricted port 36 to correspond with the small volume would be too small to be practicable, then an arrangement such as shown in Fig. 4 may be employed.

In this construction, the restricted port area is provided around and past a stem 60 which loosely fits an opening 61, the space between the stem and the walls of the opening being such as to provide the desired restricted port area.

The stem 60 is carried by a piston 62 and is interposed in passage 35 in place of the choke plug 37. The piston 62 faces the rotary valve side of passage 35 and when fluid under pressure is supplied from the rotary valve 2 to passage 35, the piston 62 will be shifted to the left, against the pressure of a spring 63, until a passage 64 is uncovered by the movement of the piston. Fluid under pressure then flows through the passage 64 and around the stem 60 to the diaphragm chamber side of passage 35.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, a main reservoir, a feed valve device for supplying fluid at a reduced pressure to the brake pipe, and a brake valve device having a service application position in which fluid under pressure is vented from the brake pipe and a release position in which fluid under pressure is supplied from the main reservoir to the brake pipe, of a timing reservoir, means for charging said reservoir through the operation of said feed valve device while the brake valve device is in service position, and means controlled by the pressure in the timing reservoir for controlling communication through which fluid under pressure is supplied from the main reservoir to the brake pipe.

2. In a fluid pressure brake, the combination with a brake pipe, a main reservoir, and a brake valve device having a release position in which fluid under pressure is supplied from the main reservoir to the brake pipe, of valve means automatically operative in the release position of said brake valve device for first supplying fluid under pressure from the main reservoir and then at a reduced pressure to the brake pipe, and means under the control of the engineer for supplying fluid from the main reservoir to the brake pipe in the release position of the brake valve device, independently of the operation of said valve means.

3. In a fluid pressure brake, the combination with a brake pipe, a main reservoir, and a brake valve device having a release position in which fluid under pressure is supplied from the main reservoir to the brake pipe, of valve means automatically operative in the release position of said brake valve device for supplying fluid under pressure from the main reservoir to the brake pipe for a limited period of time, and means controlled by the engineer for supplying fluid from the main reservoir to the brake pipe in the release position of the brake valve device regardless of the operation of said valve means.

4. In a fluid pressure brake, the combination with a brake pipe, a main reservoir, and a brake valve device having a release position in which fluid under pressure is supplied from the main reservoir to the brake pipe, of valve means automatically operative in the release position of said brake valve device for cutting off the supply of fluid from the main reservoir to the brake pipe after an interval of time, and means operable by the engineer for supplying fluid from the main reservoir to the brake pipe in the release position of said brake valve device without time limit.

5. In a fluid pressure brake, the combination with a brake pipe, a main reservoir, and a brake valve device having a release position in which fluid under pressure is supplied from the main reservoir to the brake pipe, of a valve device for controlling communication through which fluid under pressure is supplied from the main reservoir to the brake pipe, automatic means for controlling the operation of said valve device, and means operative by the engineer for also controlling the operation of said valve device.

6. In a fluid pressure brake, the combination with a brake pipe, a main reservoir, and a brake valve device having an operating handle and having a release position in which fluid under pressure is supplied from the main reservoir to the brake pipe, of a valve device for controlling communication through which fluid is supplied from the main reservoir to the brake pipe, and means under the control of the engineer and operative upon movement of the brake valve handle to release position for effecting the operation of said valve device.

7. In a fluid pressure brake, the combination with a brake pipe, a main reservoir, and a brake valve device having an operating handle and having a release position in which fluid under pressure is supplied from the main reservoir to the brake pipe, of a valve device operated upon a reduction in fluid pressure for opening communication from the main reservoir to the brake pipe, a valve operable to vent fluid under pressure from said valve device, and means controlled by the engineer for operating said valve upon movement of the brake valve handle to release position.

8. In a fluid pressure brake, the combination with a brake pipe, a main reservoir, and a brake valve device having an operating handle and having a release position in which fluid under pressure is supplied from the main reservoir to the brake pipe, of a valve device operated upon a reduction in fluid pressure for opening communication from the main reservoir to the brake pipe, a valve operable to vent fluid under pressure from said valve device, and a member associated with the brake valve handle and operable by the engineer to cause the operation of said valve upon movement of the brake valve handle to release position.

9. In a fluid pressure brake, the combination with a brake pipe, a main reservoir, and a brake valve device having an operating handle and having a release position in which fluid under pressure is supplied from the main reservoir to the brake pipe, of a valve device operated upon a reduction in fluid pressure for opening communication from the main reservoir to the brake pipe, a valve operable to vent fluid under pressure from said valve device, a member associated with the brake valve handle and adapted to effect the operation of said valve upon movement of the brake valve handle to release position, and means for maintaining said member inoperative to effect the operation of said valve unless said member is operated by the engineer.

In testimony whereof I have hereunto set my hand this 26th day of February, 1929.

CLYDE C. FARMER.